UNITED STATES PATENT OFFICE 2,296,382

DISPERSION OF HYDROPHILE PIGMENTS

Earl K. Fischer, Long Island City, Eugene G. Gluck, Jackson Heights, and William B. Reynolds, Elmhurst, N. Y., assignors to Interchemical Corporation, New York, N. Y., a corporation of Ohio No Drawing. Application August 16, 1940, Serial No. 352,864

5 Claims. (Cl. 106—288)

This invention relates to the dispersion of certain diazo pigment dyestuffs in water-immiscible organic film-forming vehicles, and is particularly directed to a method of obtaining a satisfactory dispersion of such pigments by removal of water from a pigment pulp, followed by dispersion in the presence of a polar organic liquid.

The use of water-insoluble azo dyestuffs in pigment form is limited by the fact that many azo dyestuffs which produce satisfactory colors when precipitated on textile fibers, do not produce satisfactory colors when precipitated and dried in the ordinary way, as pigments. Furthermore, many azo dyestuffs, which can be satisfactorily precipitated as pigments, give colors which are considerably poorer in strength than the same dyestuffs on textiles. These phenomena are particularly noticeable in the group of dyestuffs of the type—

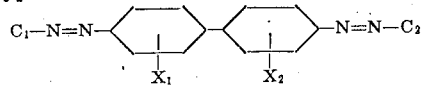

where $X_1$ and $X_2$ are members of the class consisting of hydrogen, halogen, alkyl and alkoxy, and $C_1$ and $C_2$ are residues of coupling components selected from the class consisting of naphthol-mono-sulfonic acids and naphthol-di-sulfonic acids, the dyestuffs being in the form of metallic compounds.

When dyestuffs of this class are precipitated in the absence of textile fibers, and the precipitates formed are filtered, washed and dried in conventional fashion, the resultant dried lumps are often difficult to powder. When no difficulty of this sort is encountered, the powders produced are either lacking in substantial pigment properties, or are much weaker in color strength than the dyestuff, regardless of the method of dispersion in the vehicle. The drying appears to have a definitely harmful effect on the pigment properties.

Attempts have been made to utilize these pigment dyestuffs without drying them, by precipitating in the presence of a water-immiscible organic medium, and by flushing the pigment from the water to an organic medium. However, this class of pigment dyestuffs is so hydrophilic that the organic medium will not replace the water on the dyestuff, even in the presence of surface active agents designed to facilitate this transfer. Both flushing and precipitating in the presence of the organic medium thus produce mixtures of aqueous pigment dyestuff pulp and unpigmented organic medium.

It has been proposed to overcome this difficulty by malaxating the pigment pulp on an open malaxating mill, such as a two-roll rubber compounding mill, with an organic plastic, evaporating the water while malaxation proceeds. This process, while successful, requires the use of the expensive dispersion operation of malaxation over an extended period of time, due to the necessity for evaporating large quantities of water—from four to over ten times the weight of the pigment, since filter press cakes of these pigments vary in pigment content from about 6 to 20%, depending on the pigment.

It has been found that the impairment of the pigment properties occasioned in this class of dyestuff in the ordinary drying operation is completely reversible, and that the dried pigment may be dispersed with any water-immiscible organic film-forming vehicle, by conducting the dispersion in the presence of limited quantities of water, which can be absorbed by the vehicle, and can be dissipated as vapor by the normal heating of conventional dispersion mills.

We have now discovered that the dried pigment can be dispersed without the necessity for adding water to the composition, by dispersing the pigment in the presence of organic media of such high polarity that they have a dielectric constant of 30 or higher, measured at 25° C.

For optimum results, enough of the organic compound should be used to wet the pigment, although considerably higher quantities can be used, particularly when the organic compound is miscible with the vehicle to be used. Ordinarily, the organic compound should equal at least one-third the weight of the pigment. Compounds which have been found suitable for this dispersion process include methyl alcohol, ethylene and other glycols, glycerin, sorbitol, and other hydroxy compounds of high polarity, formamide, and nitro compounds such as nitrobenzene.

The effectiveness of water for this purpose is often increased by the use of these polar compounds, and the addition may be made as an aqueous solution of the reagent. Frequently small quantities of the solution may be used to give the same effect as relatively larger quantities of water. Where such combinations are used, the water and polar compound together should equal at least about one-third of the weight of the pigment.

The organic media may be added to the pigment in a variety of ways. The reagents may be added to the color slurry either during or after the necessary chemical reactions have been made to take place, and the pigment may then be processed in the usual way. Or, the pigment in the form of filter press cakes may be mixed with the reagent in a dough mixer, and the resulting product may subsequently be dried. Or the dry pigment may be stirred with the reagent by hand or by means of mixers or blenders such as the dough mixer, pebble mill, putty chaser mill, Banbury mixer, change can mixer, or other suitable mechanical device, and the resulting pigment paste may be mixed with the organic film-forming vehicles and ground in any of the conventional mills which are used in the paint and printing ink arts. The dry pigment may in certain cases be ground directly with the oils. The polar compounds may then be added, and the resultant mixture given an additional grinding to bring out the color value. This last method is less efficient than the preferred procedures enumerated above.

Typical examples of our invention are the following:

Example 1

20 parts by weight of the dry blue pigment, prepared by coppering the coupling of tetrazotized dianisidine with 2-naphthol-6-sulfonic acid (Schaeffer's salt) are stirred in a dough mixer with 10 parts by weight ethylene glycol until the mixture is uniform. To this mixture is then added, with continuous stirring—

70 parts by weight a lithographic linseed oil varnish of viscosity designated in the trade as No. 3.

Mixing for one hour ordinarily suffices to incorporate all the ingredients into a uniform paste which may then be ground in the usual way by passing from three to five times over a three-roll ink mill.

Other compounds and reagents may be added during the mixing in the dough mixer, and in certain cases the addition of surface active agents such as the fatty alcohol sulfates is advantageous.

The product obtained in this manner is suitable for use in formulating printing inks either as a full strength ink or in smaller quantities for the purpose of toning.

Example 2

To—
10 parts by weight of the dry pigment of Example 1 there is added 20 parts by weight of methyl alcohol. The pigment and alcohol are stirred by hand, then allowed to stand for about 24 hours.

20 parts by weight a linseed varnish with No. 1 body is then added.

This combination is stirred to provide fairly uniform distribution of the softened pigment in the oil, and the mixture is then ground on an ink mill to the required finish.

Example 3

A mixture of twenty parts of the dry pigment of Example 1 and twenty parts of sorbitol is made by stirring for one hour in a dough mixer. This paste is ground with sixty parts of a thermoplastic resin on a two roll rubber mill. The pigment resin in dispersion ordinarily requires from ten to twenty minutes grinding after which the dispersion may be removed in sheet form and dissolved in toluene or xylene.

Example 4

Twenty parts of dry pigment of Example 1 is stirred with an equal weight of a 50% aqueous solution of sorbitol. This paste is then mixed with sixty parts by weight of a lithographic varnish, and the mixture is ground on a three roll mill until the desired fineness is obtained. The base ink so prepared is of a deep blue hue, and may be used in formulating finished inks for various printing services by the incorporation of suitable driers, wax compounds, bodied oils, etc.

Example 5

The dry pigment of Example 1 is mixed with an equal weight of a 50% aqueous solution of ethylene glycol. This paste is then ground for about fifteen minutes on a two roll rubber mill with a maleic modified alkyd resin (Amberol 801) in the proportion of forty parts of pigment paste to seventy of resin. The resulting chip has a pigment content of 20%, and may be formulated into a lacquer having the following composition:

|                                    | Parts |
|------------------------------------|-------|
| Organic solvent soluble urea resin | 15    |
| Oil modified alkyd resin           | 15    |
| Mill chip                          | 5     |
| Mixed solvents                     | 65    |

This lacquer is of spraying consistency, and produces a finish of deep blue-black color.

In certain cases the addition of these organic compounds permits an increase in the pigment content of an ink without increasing the consistency of the composition beyond useful limits. Thus an ink containing 20% of a 50% aqueous pulp of the pigment of Example 1 ground in a No. 3 bodied linseed oil, was a stiff paste, and had a yield value in excess of 3000 dynes/cm.$^2$, and could not be measured in the standard MacMichael viscosimeter.

A similar ink containing 20% of pigment prepared with an equal weight of a 50% aqueous solution of sorbitol, while retaining the strength and hue characteristics of the pigment, was fluid and was found to have a viscosity of 154 poises and a yield value of 83 dynes/cm.$^2$.

While we have shown only one pigment in the above examples, for the purpose of comparing the effectiveness of various addition agents, any other pigments of the indicated class may be used. Typical pigments are the metallic salts or complexes obtained from the couplings of tetrazotized dianisidine, benzidine, dichlor benzidine, tolidine, with coupling components such as F-acid (2-naphthal-7-sulfinic acid), Schaeffer's salt, L-acid (1-naphthol-5-sulfonic acid), and R-salt (2-naphthol-3-6-disulfinic acid), using metals such as the alkali metals, the alkaline earths, nickel, cobalt, zinc, copper, iron, manganese, aluminum and chromium.

The fact that the polar compounds used are often not compatible with the vehicles used for dispersion does not affect the excellence of the results obtained. Substantially any of the common organic coating compositions may be used to disperse the pigment. We have used raw linseed bodied oils and similar oils, oleoresinous varnishes, cellulose ester and cellulose ether lacquers, and synthetic and natural resin solutions, including practically all the resins commonly used in the coating industry.

Various modifications can of course be made in our invention without departing from its scope, which is defined in the claims.

While other methods of measuring polarity of a liquid are known, the term "polarity" as used in this specification refers to polarity as measured in terms of dielectric constant.

We claim:

1. The method of dispersing a pigment of the formula:

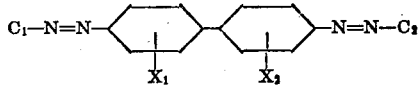

where $X_1$ and $X_2$ are members of the class consisting of hydrogen, halogen, alkyl and alkoxy, and $C_1$ and $C_2$ are residues of coupling components selected from the class consisting of naphthol mono-sulfonic acids and naphthol di-sulfonic acids, in the form of a metallic compound, which pigment is not dispersible in an organic non-aqueous liquid in its dry state, which comprises grinding the pigment in a non-aqueous organic film-forming vehicle, in the presence of an amount of a polar organic compound immiscible with the vehicle and having a dielectric constant of at least 30, at least equal to one third the weight of the pigment to produce an even dispersion of the pigment and polar compound in the vehicle.

2. The method of dispersing a pigment of the formula:

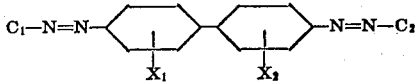

where $X_1$ and $X_2$ are members of the class consisting of hydrogen, halogen, alkyl and alkoxy, and $C_1$ and $C_2$ are residues of coupling components selected from the class consisting of naphthol mono-sulfonic acids and naphthol di-sulfonic acids, in the form of a metallic compound, which pigment is not dispersible in an organic non-aqueous liquid in its dry state, which comprises grinding the pigment in a non-aqueous organic film-forming vehicle, in the presence of an amount of a polar organic compound immiscible with the vehicle and having a dielectric constant of at least 30, sufficient to wet the pigment and at least equal to one third of the weight of the piment to produce an even dispersion of the pigment and polar compound in the vehicle.

3. The method of dispersing a pigment of the formula:

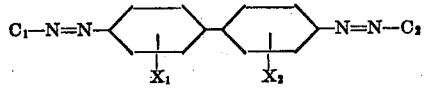

where $X_1$ and $X_2$ are members of the class consisting of hydrogen, halogen, alkyl and alkoxy, and $C_1$ and $C_2$ are residues of coupling components selected from the class consisting of naphthol mono-sulfonic acids and naphthol di-sulfonic acids, in the form of a metallic compound, which pigment is not dispersible in an organic non-aqueous liquid in its dry state, which comprises grinding the pigment in a non-aqueous organic film-forming vehicle, in the presence of an amount of a mixture of water and a polar organic compound having a dielectric constant of at least 30, at least equal to one third the weight of the pigment the polar mixture being immiscible with the vehicle, to produce an even dispersion of the pigment and polar mixture in the vehicle.

4. The method of claim 1 in which the polar organic compound is a water-miscible hydroxy compound.

5. The method of claim 1 in which the polar organic compound is a polyhydric alcohol.

EARL K. FISCHER.
EUGENE G. GLUCK.
WILLIAM B. REYNOLDS.